May 23, 1933. L. W. BLAU 1,911,137
METHOD AND APPARATUS FOR GEOPHYSICAL EXPLORATION
Filed April 16, 1931
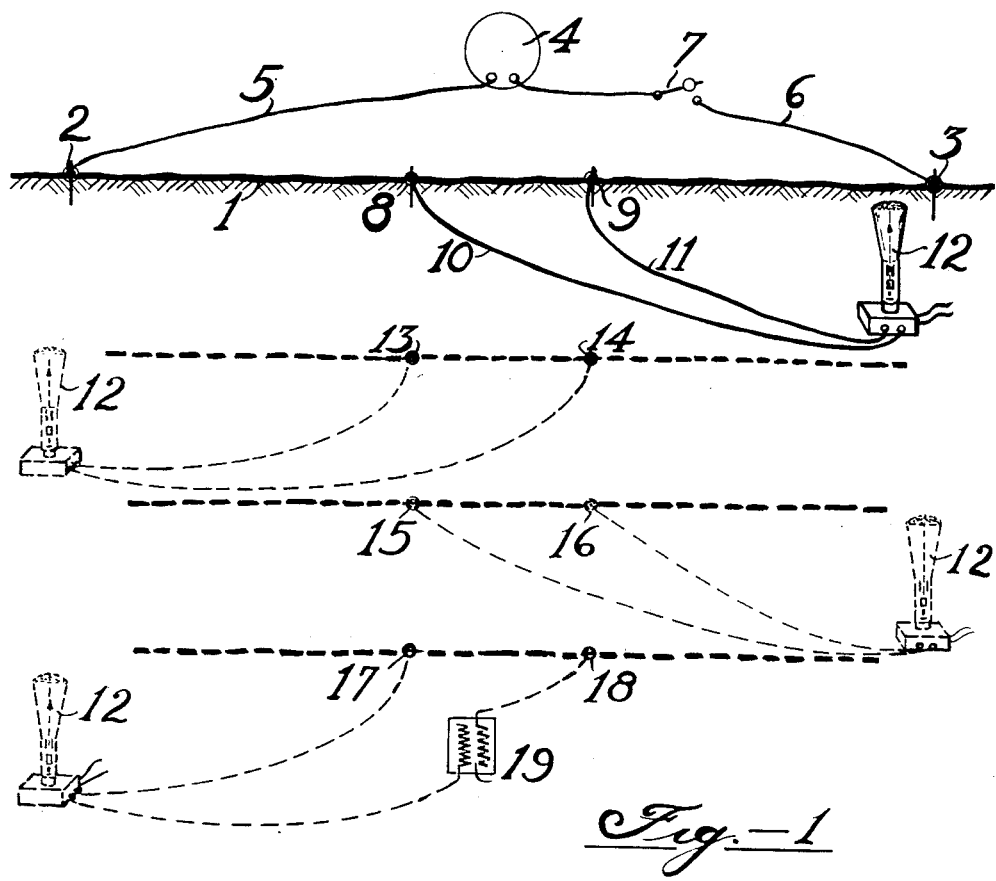
Fig.-1
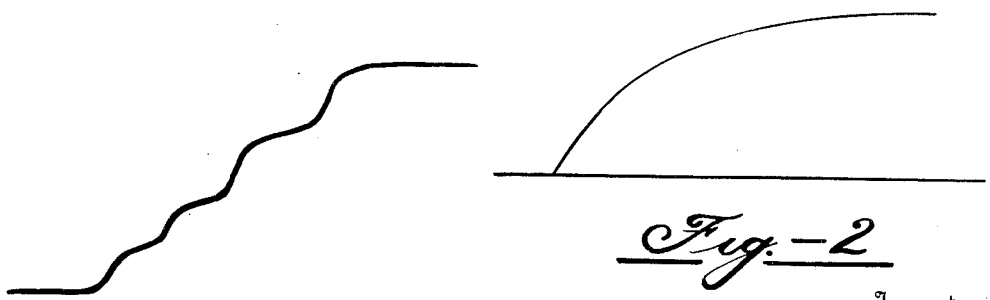
Fig.-2
Fig.-3
Inventor
Ludwig W. Blau
By
W. E. Currie, Attorney Patented May 23, 1933

1,911,137

UNITED STATES PATENT OFFICE

LUDWIG W. BLAU, OF HOUSTON, TEXAS, ASSIGNOR TO STANDARD OIL DEVELOPMENT COMPANY, A CORPORATION OF DELAWARE

METHOD AND APPARATUS FOR GEOPHYSICAL EXPLORATION

Application filed April 16, 1931. Serial No. 530,472.

This invention relates to improvements in methods and apparatus for determining the presence of valuable minerals, oil, and other subterranean deposits. In a preferred form the invention comprises the use of a direct electrical current passing between electrodes embedded in the surface of the earth. The characteristics of this current as modified by its passage through intervening strata are measured and recorded at a plurality of points.

The invention will be fully understood from the following description read in connection with the accompanying drawing, in which Fig. 1 is a diagram showing the method of applying the current and recording it; and Figs. 2 and 3 are diagrams showing typical curves obtained.

Referring to Fig. 1, reference numeral 1 indicates the surface of the earth. Electrodes 2 and 3, spaced at a substantial distance, are embedded in the earth and connected to a suitable source of direct electrical current 4 by wires 5 and 6. A switch 7 is provided for controlling the flow of current.

For the purposes of this invention it is immaterial what type of electrodes are used provided adequate contact is obtained with the earth. Moreover, the distance between the electrodes may be widely varied. In general, however, I prefer to have them about one mile apart. The potential difference may also be varied according to conditions. For most purposes good results can be obtained by using a potential difference of less than 500 volts.

Electrodes 8 and 9 are in contact with the earth approximately in the direct line connecting electrodes 2 and 3. Wires 10 and 11 connect electrodes 8 and 9 to a suitable indicating or recording instrument preferably an oscillograph 12. Any convenient even number of such electrodes may be used, for example pairs of electrodes as indicated in the positions 13,14, 15,16, 17,18. These are preferably arranged in pairs on lines in general running parallel to the direct line connecting electrodes 2 and 3, but any other suitable lines of measurement may be chosen.

If desired a transformer may be installed in the oscillograph circuit as indicated at 19. In this way the effect of the natural earth current on the oscillograph can be eliminated. Under most conditions this current is not of sufficient magnitude to interfere with the accuracy of the results obtained.

The method of operating the invention will be understood from the following specific example.

Electrodes 2 and 3 are set in the earth at a distance of from several hundred feet to a few miles apart and a potential difference up to about 500 volts is applied across them from the source of current 4. When the switch 7 is closed the current passing between electrodes 2 and 3 builds up gradually depending upon the electrical constants of the strata through which it passes. The varying current from its zero value at the instant of closing the switch to its steady value sometime afterwards or any curve representing such current, is called a transient. The pair of electrodes 8,9 receives the current and transmits it to the oscillograph 12. This is operated in the usual manner to give a curve indicating the current or potential, depending on whether the oscillograph is current or voltage sensitive.

If the earth strata through which the current passes are homogeneous, the transient obtained will increase steadily to a certain constant value, giving an exponential curve as a rule, as shown in Fig. 2.

If there are layers of different materials having different electrical characteristics in the earth through which the current passes, the transient obtained will show "ripples" as shown in Fig. 3; each ripple will be similar to the complete transient obtained with a homogeneous medium but of shorter duration being representative of a certain layer. The number of such ripples recorded will increase as the electrodes 8, 9 are moved away in either direction from the line 2, 3 and also as the distance 2, 3 is increased.

It is known that for a single layer supplied with direct current, the current requires for its building up to the steady value a time $$T = \frac{Ah}{R}$$

where A is a constant, $h$ is the depth of the layer, and R is the resistance of the material composing the layer. (See article by Franz Ollendorff in Archiv Fuer Elektro-Technik, vol. 23, No. 3, p. 261–78, 1930.) If to the single layer there is added another layer of different resistance, the time of building up due to the first layer will still be about the same, since resistances in the ground are high; however, there will be a modification due to the second layer, which will contribute another transient whose duration will be proportional to the thickness of the layer. The various ripples thus become identical with certain subterranean strata and the changes in the thickness of any certain layer from one place to another are indicated by its ripples. A ripple of short duration denotes a thin layer while a thick layer causes a long ripple. The duration of each ripple is plotted against the distance on the surface from a point of reference in the same manner as in seismology, where the times of arrival of the seismic waves are plotted against distance.

Having obtained the desired indications from the electrodes 8, 9 they are moved to the position 13, 14 and similar readings are made. As many additional readings as required are obtained, as for example by moving the electrodes to the positions 15, 16 and 17, 18. The space between the various parallel or other lines, representing the area in which the indications are received, may be varied greatly in accordance with special conditions. In general, it is sufficient to take readings at intervals of about five hundred yards.

As the equipment is moved over the region to be tested, a number of records will be obtained showing at each location of test the number of earth strata of different electrical characteristics and the approximate thickness of such strata, affording a convenient means for the correlation of strata from station to station.

I am aware that direct current has heretofore been used in evaluating underground structure by determining regions of equipotential about an electric current passing through the earth. In the present invention, however, a different principle is used. The effect of the transient of a direct current flowing through the earth between electrodes is caused to impart its characteristics as modified by its passage through the earth to another electrical circuit arranged substantially in a line parallel to the flow of current, or to a plurality of circuits arranged in such parallel lines.

Various changes and alternative arrangements may be made within the scope of the appended claims in which it is my intention to claim all novelty inherent in the invention as broadly as the prior art permits.

I claim:

1. In the determination of underground structure the improvement which comprises causing a direct electrical current to flow through the earth, establishing an electrical circuit in a line subject to the influence of the current and preferably substantially coincident with or parallel to the line of current flow, and receiving an indication of the transient of said current, as modified by its passage through the earth, upon a suitable indicating instrument arranged in said circuit.

2. Method according to claim 1, in which a plurality of circuits are established and indications are received at each, all substantially in lines parallel to the line of current flow.

3. In a method of determining underground structure the improvement which comprises passing a direct electrical current between spaced electrodes embedded in the surface of the earth, and receiving the transient of said current, as modified by its passage through the earth, upon an electrical circuit in which there is a suitable indicating instrument.

4. Method according to claim 3, in which the received electrical current is caused to pass through an indicating instrument which indicates only the transient excluding the natural earth current.

5. Method of geophysical exploration, comprising establishing an area of direct current flow of electricity, establishing a plurality of testing stations along lines in general parallel to the line of current flow, receiving indications of the transient at each of said stations, and determining the underground structure by correlating the data so obtained.

6. Apparatus for geophysical exploration, comprising a pair of spaced electrodes embedded in the earth, means for passing direct current between said electrodes, and an electrical circuit for determining the characteristics of the transient of the current passing between said electrodes and including an oscillograph connected with a transformer.

7. In the determination of underground structure the improvement which comprises causing a direct electrical current to flow through the earth, establishing an electrical circuit in a line subject to the influence of the current and preferably substantially coincident with or parallel to the line of current flow, and measuring the voltage of the transient of said current as modified by its passage through the earth by means of a suitable indicating instrument arranged in said circuit.

LUDWIG W. BLAU.